Sept. 9, 1969          D. T. DEAN          3,466,644

STIMULATOR FOR VEHICLE OPERATORS

Filed Oct. 3, 1966

INVENTOR
Donald T. Dean

BY *Hovey, Schmidt, Johnson & Hovey,*
ATTORNEYS.

United States Patent Office 3,466,644
Patented Sept. 9, 1969

3,466,644
STIMULATOR FOR VEHICLE OPERATORS
Donald T. Dean, 900 E. Ash,
Salina, Kans. 67401
Filed Oct. 3, 1966, Ser. No. 583,637
Int. Cl. G08b 21/00
U.S. Cl. 340—279     4 Claims

ABSTRACT OF THE DISCLOSURE

Apparatus coupled with the steering wheel of a vehicle for delivering a mild shock to the operator to thereby stimulate the operator to assure that he will remain alert. The shocks are imparted at irregular time intervals to make it difficult for the operator to become conditioned to a particular pattern and thus develop an immunity to the stimulus.

---

This invention relates to apparatus for delivering a mild shock to the operator of a motor vehicle in order to assure that the operator will remain awake and alert and, more particularly, relates to apparatus as aforesaid which makes electrical contact with the hands of the operator through the steering mechanism of the vehicle and mildly shocks the operator with electrical pulses occurring at irregular intervals.

The primary object of this invention is to provide a means of stimulating the operator of a motor vehicle during periods of drowsiness of unattentiveness to assure that the driver remains awake and alert to traffic and road conditions, in order to prevent the possible occurrence of an accident which could cause injury or death to the operator or other passengers of the vehicle.

As a corollary to the foregoing object, it is an important aim of the instant invention to provide a means of directly stimulating the driver without utilizing audible alarm devices or apparatus coupled to the brakes or other control components of the vehicle, and which continuously delivers a stimulus to the driver irrespective of the driver's actual physical and/or mental condition.

Further, therefore, it is an important object of this invention to provide a driver stimulating means as aforesaid which maintains the driver awake and alert at all times without waiting to alert the driver after a condition has occurred which may be indicative of the inability to drive the vehicle in the proper manner.

Still another important object of the invention is to provide such a driver stimulator which effects the stimulus through the use of mild electrical shocks imparted to the driver by the steering wheel, wherein the shocks are delivered to the driver at irregular time intervals so that the individual will not become conditioned to a particular pattern and thus develop an immunity to the stimulus.

Figure 1:
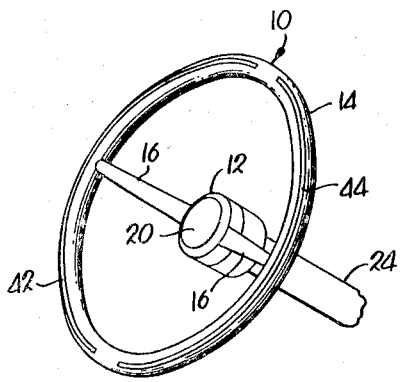
FIGURE 1 is a perspective view of a steering wheel and the upper portion of the steering column, showing the contact inserts of the invention mounted in the rim of the wheel.
Figure 2:
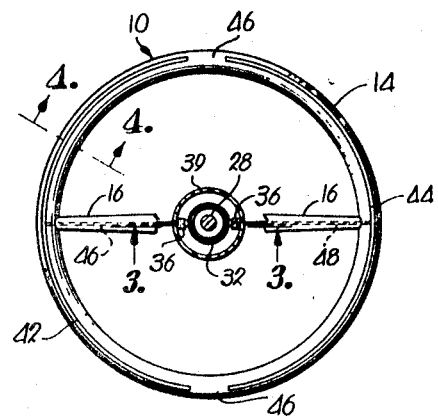
FIG. 2 is a view looking axially of the steering wheel, the hub thereof being shown in transverse section.
Figure 4:
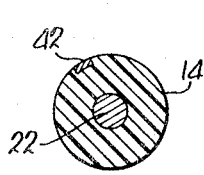
FIG. 4 is a sectional view taken along line 4—4 of FIG. 2.

Referring to FIGS. 1–4, the numeral 10 broadly denotes a steering wheel of a conventional type having a hub 12, a circular rim 14, and a pair of opposed radials 16 interconnecting hub 12 and rim 14. Hub 12 is open at the backside thereof to present a cylindrical cavity 18, the front of the hub being closed by a horn button 20 and its associated switch mechanism (not shown) for operating the horn of the vehicle. Rim 14 is composed of a nonconductive substance such as a synthetic resin material and is reinforced by a central core 22 (FIG. 4) which may, for example, comprise a metal ring rigidly joined to the ends of radials 16.

A steering column 24 is shown fragmentarily and has an open, upper end 26 in closely spaced relationship to the backside of hub 12. A steering shaft 28 (forming a part of a conventional steering mechanism not shown in detail) extends axially of column 24 and outwardly of open end 26 where it is joined to the central section of hub 12. A collar 30 is coaxial with shaft 28 and surrounds the latter in spaced relationship thereto, collar 30 being composed of a nonconductive, insulating material. Collar 30 mounts a pair of spaced contact rings 32 and 34 on the outer surface thereof, the collar being secured to column 24 and fixed with respect to the latter.

A pair of brush holders 36 are disposed in cavity 18 and secured to the cylindrical wall portion 39 of hub 12. Holders 36 mount a pair of contact brushes 38 and 40 and maintain the latter in sliding electrical contact with respective rings 32 and 34. Brushes 38 and 40 are in approximate alignment with radials 16, as is clear in FIGS. 2 and 3.

A pair of electrically conductive elements in the form of strips or inserts 42 and 44 are embedded in respective semicircular segments of rim 14. Each insert 42 or 44 is approximately semicircular in configuration and is separated from the other insert by two short stretches 46 of rim 14. As is clear in FIG. 4, the outer surface of insert 42 is exposed and is flush with the outer surface of rim 14; insert 44 is disposed in like manner.

Radials 16 are preferably formed with a longitudinal passage therein or channeled on their undersides to permit connections to be made between inserts 42 and 44 and brushes 40 and 38 with the wires hidden from view. A conductor 46 is shown interconnecting insert 42 and brush 40, while a conductor 48 is illustrated interconnecting brush 38 and insert 44. To adapt existing steering wheels for use with the instant invention, an electrically conductive tape could be utilized instead of inserts 42 and 44 and disposed in adhering relationship to the outer surface of rim 14.

Figure 5:
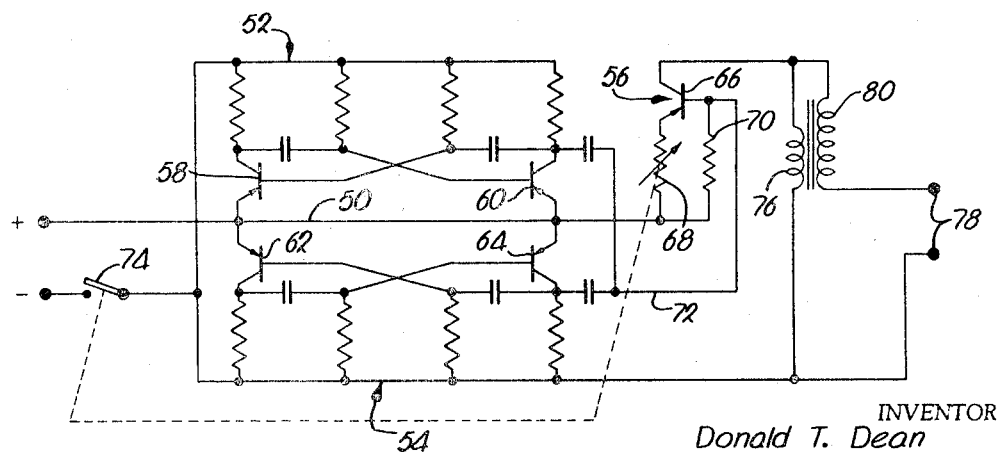
FIG. 5 is an electrical schematic diagram of the pulse generator circuitry.

Referring to FIG. 5, the vehicle battery is connected across the terminals labeled plus and minus, the plus terminal having a lead 50 connected thereto which forms the common or return lead of a pair of multivibrator sections 52 and 54 and a transistor gate 56. Multivibrator 52 utilizes a pair of PNP transistors 58 and 60 as the active elements thereof, multivibrator 54 being an identical circuit configuration utilizing a pair of PNP transistors 62 and 64. Both multivibrator circuits are conventional and of the free running type, the only difference between the two circuits being the inductive and capacitive values of the frequency-determining components.

Gate 56 utilizes a PNP transistor 66 having its emitter connected to lead 50 through a variable resistor 68. The base of transistor 66 is connected to lead 50 through a resistor 70 and is coupled to both multivibrator outputs by a lead 72. The collector of transistor 66 is connected to the negative terminal through a normally open switch 74 when the latter is closed, the primary winding 76 of a step-up transformer being interposed in series with the connection from switch 74 to the collector of transistor 66. An output from the gate is obtained at a pair of terminals 78 connected to the secondary winding 80 of the transformer and the negative power terminal respectively when the circuitry is in operation.

Figure 3:
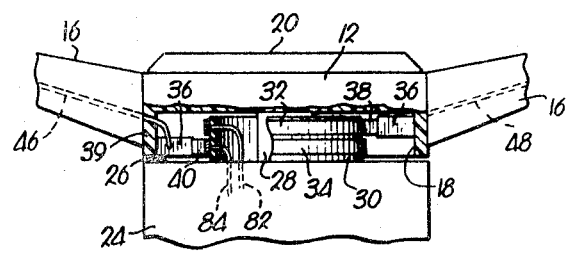
FIG. 3 is a sectional view taken substantially along line 3—3 of FIG. 2.

It will be appreciated that the circuitry illustrated in FIG. 5 will form a compact unit that may be readily mounted beneath the dashboard of the vehicle or on the steering column. A pair of leads 82 and 84 are connected to respective contact rings 32 and 34 through collar 30 as illustrated in FIG. 3, leads 82 and 84 then extending along column 24 therewithin to a location where the leads are brought out through an opening (not shown) in the column and ultimately connected to output terminals 78. Other arrangements for running leads 82 and 84 between contact rings 32 and 34 and terminals 78 may be utilized as desired and expedient to accommodate particular vehicles and mounting locations of the multivibrator circuitry unit.

In operation, the driver closes switch 74 when he feels that he is likely to become drowsy. Switch 74 is illustrated as operable in conjunction with variable resistor 68, the latter being a potentiometer of the rotatable wiper type commonly employed for various control and adjustment purposes in radio and television receivers. Switch 74 is attached to the potentiometer and is closed by initial movement of the wiper shaft. Preferably, the switch-resistor combination should be arranged such that the potentiometer section presents its maximum resistance upon closure of switch 74, and progressively less resistance as the wiper shaft is rotated further.

With the two multivibrators 52 and 54 in operation, pulses are delivered to the base of gate transistor 66 via lead 72 in accordance with the frequencies of oscillation of the two multivibrators. Different frequencies are preferably utilized, such as 30 c.p.s. for one of the multivibrators and 100 c.p.s. for the other. This will cause the pulses to arrive at the base of transistor 66 at irregular intervals. Each pulse places the emitter-collector circuit of transistor 66 in hard conduction to, in effect, couple resistor 68 and primary winding 76 in series directly across the power terminals of the vehicle battery. Thus, in accordance with the voltage drop across primary winding 76, a desired potential difference is established across output terminals 78 momentarily each time transistor 66 is rendered conductive by a pulse from the multivibrators of negative polarity.

The transformer 76, 80 may comprise an ignition transformer of the type utilized with miniature internal combustion engines for model airplanes and the like. Such transformers are wound with fine wire and present high impedances on the order of 2,000 ohms in the secondary winding. Thus, although a maximum instantaneous peak voltage of 500 to 700 volts may be delivered by the secondary, the circuitry is inherently current limiting in nature because of its impedance.

As the driver steers the vehicle by grasping the rim 14 of steering wheel 10, it will be appreciated that one hand will normally contact insert 42 while the other hand contacts insert 44. Thus, in effect, the driver is electrically connected across output terminals 78 and, therefore, will receive a mild shock each time transistor 66 is gated on. The severity of the shock is readily controllable by adjusting resistor 68 to provide a shock level which is comfortable to the driver and yet serves as a constant reminder that alertness is required for safe driving. The current limiting feature of the invention discussed above positively maintains the shock-producing capability of the pulse generator circuitry below a harmful level. The employment of irregularly recurring pulses to gate transistor 66, however, makes it difficult for the driver to condition himself to the mild shock because of the irregularity of the shock pattern.

Having thus described the invention, what is claimed as new and desired to be secured by Letters Patent is:

1. In an operator stimulator where electrically conductive structure on the steering apparatus of a vehicle is disposed for grasping by the operator as the vehicle is steered, the combination with said structure of a pulse generator coupled thereto for exciting said structure with time-spaced electrical pulses occurring at irregular intervals and having a shock-producing capability below a harmful level but of sufficient magnitude to stimulate the operator during steering of the vehicle to thereby assure that the operator remains alert, said pulses establishing an irregular shock pattern to make it difficult for the operator to become conditioned to the stimulus.

2. The invention of claim 1,
said generator including a pair of generating sections having electrical pulse outputs of different frequencies, and means responsive to both of said outputs for delivering said irregularly occurring pulses to said structure.

3. The invention of claim 2,
each of said generating sections comprising a multivibrator,
said delivering means including a gate operated by said outputs, and a step-up transformer having a primary winding adapted for coupling with a source of electrical energy and operably coupled with said gate, and a secondary winding coupled with said structure.

4. The invention of claim 1,
said generator including means for limiting the current drawn therefrom by the operator to a safe value.

References Cited

FOREIGN PATENTS 664,145  8/1938  Germany.

JOHN W. CALDWELL, Primary Examiner

P. PALAN, Assistant Examiner

U.S. Cl. X.R.

340—407